US008197708B2

(12) United States Patent
Cho et al.

(10) Patent No.: US 8,197,708 B2
(45) Date of Patent: Jun. 12, 2012

(54) DICHROIC DYE FOR POLARIZATION FILM, COMPOSITION COMPRISING THE SAME FOR POLARIZATION FILM, METHOD FOR FORMING POLARIZATION PLATE AND POLARIZATION PLATE PREPARED THEREBY

(75) Inventors: Yong-Il Cho, Daejeon (KR); Jeong-Su Yu, Daejeon (KR); Eun-Kyung Kim, Daejeon (KR); Sin-Young Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 122 days.

(21) Appl. No.: 12/309,615

(22) PCT Filed: Sep. 4, 2007

(86) PCT No.: PCT/KR2007/004255
§ 371 (c)(1),
(2), (4) Date: Jan. 23, 2009

(87) PCT Pub. No.: WO2008/030024
PCT Pub. Date: Mar. 12, 2008

(65) Prior Publication Data
US 2009/0290214 A1 Nov. 26, 2009

(30) Foreign Application Priority Data
Sep. 8, 2006 (KR) .................. 10-2006-0087045

(51) Int. Cl.
*C09K 19/00* (2006.01)
*C09K 19/06* (2006.01)
*C09K 19/52* (2006.01)

(52) U.S. Cl. .......... 252/299.01; 252/299.6; 430/20; 428/1.1; 349/1; 349/56; 349/193; 359/487.02

(58) Field of Classification Search ............. 252/299.01, 252/299.6; 430/20; 428/1.1; 349/1, 56, 349/193; 359/487.02
See application file for complete search history.

(56) References Cited

U.S. PATENT DOCUMENTS

| 4,596,666 A | 6/1986 | Blunck et al. |
| 6,174,394 B1 | 1/2001 | Gvon et al. |
| 6,337,111 B1 | 1/2002 | Ichihashi |
| 6,798,487 B1 | 9/2004 | Ohtani et al. |
| 2010/0066950 A1* | 3/2010 | Cho et al. ............ 349/106 |

FOREIGN PATENT DOCUMENTS

| DE | 32 44 815 | 6/1984 |
| EP | 0 065 869 | 12/1982 |
| EP | 0 806 697 A2 | 11/1997 |
| JP | 2001-91747 | 4/2001 |
| JP | 2003-232919 | 8/2003 |
| JP | 2004-535483 | 11/2004 |
| KR | 10-2006-0063753 | 6/2006 |
| WO | WO 02/090447 A1 | 11/2002 |
| WO | WO 2004/085547 A1 | 10/2004 |
| WO | WO 2005/045485 | 5/2005 |
| WO | WO 2005/105932 A1 | 11/2005 |
| WO | WO 2006/064852 | 6/2006 |

OTHER PUBLICATIONS

Rompp Online, Version 3.6, "Liquid crystals", 2010.

* cited by examiner

*Primary Examiner* — Geraldina Visconti
(74) *Attorney, Agent, or Firm* — McKenna Long & Aldridge LLP

(57) ABSTRACT

Disclosed are a new dichroic dye having liquid crystal properties and dichroic properties and capable of being used for forming a polarization film with excellent heat resistance, durability, and polarizing properties, a composition including the same for a polarization film, a method for forming a polarization plate with excellent durability using the composition, and a polarization plate prepared thereby. The new dichroic dye has a structure of R1-L1-(M,L,D) (where, D is a dichroic structure, M is a structure with liquid crystal properties, R1 is a reactive end functional group, and L and L1 are linking structures). The composition for a polarization film includes the dichroic dye. In the method for forming the polarization plate, the composition for a polarization film is applied to a substrate and cured to prepare the polarization plate. The polarization plate has excellent dichroic ratio, heat resistance, durability, and polarizing properties.

17 Claims, 2 Drawing Sheets

[Fig. 1]
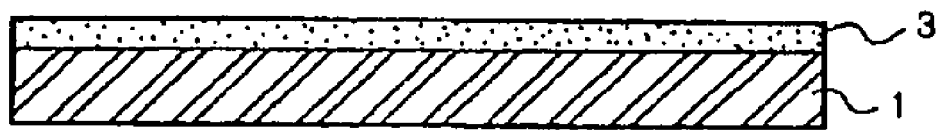

[Fig. 2]
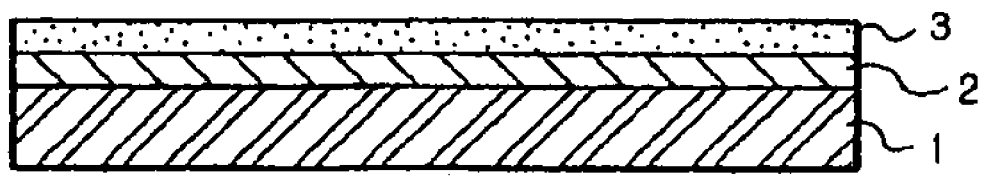

DICHROIC DYE FOR POLARIZATION FILM, COMPOSITION COMPRISING THE SAME FOR POLARIZATION FILM, METHOD FOR FORMING POLARIZATION PLATE AND POLARIZATION PLATE PREPARED THEREBY

TECHNICAL FIELD

This application claims priority to International Application No. PCT/KR2007/04255 filed on Sep. 4, 2007 which claims priority to Korean Patent Application No. 2006-87045 filed on Sep. 8, 2006, both of which are incorporated by reference, as if fully set forth herein.

The present invention relates to a dichroic dye for a polarization plate, a composition comprising the same for a polarization film, a method for forming a polarization plate with excellent durability using the same, and a polarization plate prepared thereby. More particularly, the present invention relates to a dichroic dye having liquid crystal properties and dichroic properties and used for forming a polarization film with excellent heat resistance, durability, and polarizing properties, a composition comprising the same for a polarization film, a method for forming a polarization plate with excellent durability using the same, and a polarization plate prepared thereby.

BACKGROUND ART

Recently, liquid crystal displays have come into the limelight as one of the most competitive display devices in place of cathode ray tubes in view of their various merits such as light weight and low power consumption. In particular, since a thin film transistor liquid crystal display (TFT-LCD) driven by thin film transistors (TFTs) can independently drive respective pixels, it ensures a rapid response time of liquid crystals, which enables high-definition video pictures. Accordingly, the TFT-LCD has increasingly expanded to its application fields of notebook computers, wall-mounted televisions, etc.

Generally, since linear polarizers are disposed outside both glass substrates in the fabrication of color TFT-LCDs, the color TFT-LCDs are used to display information by adjusting the amount of light transmitted from the rear side through the actions of liquid crystal molecules between the glass substrates.

Each of the linear polarizers disposed on the glass substrates generally includes a polarization film, which comprises a base, such as a film made of oriented polyvinyl alcohol or derivatives thereof, and polarization materials including an iodine or dichroic dye and applied to the substrates.

An iodic polarization film has excellent initial polarization performance in the range of visible rays. However, the iodic polarization film not only has considerably lagging polarization performance in the range of near-ultraviolet rays, but is also vulnerable to water and heat. Further, when it is used in a high temperature humidity condition for long time, its durability becomes deteriorated.

To improve the durability, it is considered to treat the polarization film with an aqueous solution which contains formalin or a boric acid or to use a polymer film with low moisture permeability as a protective film for the polarization film. However, these methods fail to sufficiently improve the durability.

Meanwhile, a dye-based polarization film comprising dichroic dyes as a polarizing material generally has superior durability at high temperature and humidity as compared to the iodic polarization film. Thus, it is used for automobile dashboards, planes, liquid crystal projectors, etc. which require excellent heat resistance and durability. However, the dye-based polarization film has limited heat resistance and durability depending on the kind of dye and polymer.

KR Patent Laid-open Publication No. 2006-0063753 discloses a polymerizable mesogenic formulation which comprises a polymerizable mesogenic compound having a polymerizable group, a dichroic dye, a chain transfer agent, a polymerization initiator, and a solvent, a polymer film using the same, a polarizer including the film, and a use thereof in identification of safety mark.

JP Patent Laid-open Publication No. 2001-091747 discloses a method of manufacturing a liquid crystal cell substrate having excellent thin and lightweight properties, heat resistance, shock resistance and stable quality. The liquid crystal cell substrate includes a gas barrier layer, a cross-linked resin layer, and a polarizing layer, wherein the polarizing layer is formed of a dichroic dye having lyotropic liquid crystal properties, liquid crystal polymer layer containing a dichroic dye, or a lyotropic material containing a dichroic dye.

U.S. Pat. No. 6,337,111 discloses a thin film having light absorption anisotropy, which makes it easy to perform optical functions, such as attenuating, polarizing, scattering or shielding light including laser light and natural light and a process for preparing the same. According to the US patent document, an alignment film is formed on a glass and plastic substrate, and a dichroic dye solution is applied to the alignment film. Then, a solvent is removed from the solution, thereby forming an anisotropic thin film showing light absorption characteristics. The dichroic dye is azo or anthraquinone groups and has liquid crystal properties and photo- or heat-crosslinking reactivity.

JP Patent Laid-open Publication No. 2003-232919 discloses a polarizing plate, which has good properties in view of scratch resistance, processability, yield and productivity, a method for manufacturing the same, and an antireflection layer or an optical element using the same. Further, a composition comprising a photoreactive dichroic dye containing an alignment compound and a photoreactive compound is used to form a polarizing film.

The aforementioned processes have limits in mixing dichroic dyes and polymerizable liquid crystals, and thus the polarization films also have limited polarizing degrees. In the case of the polarization film of lyotropic liquid crystals, the polarization film has a region minutely aligned by a shear force, which decreases an overall polarizing degree. In addition, conventional techniques are still not sufficient to form a polarization film which satisfies superior polarizing performance and durability at high temperature and humidity. Accordingly, there is a need of a polarization plate that has excellent polarizing performance and durability under high temperature and humidity.

DISCLOSURE OF INVENTION

Technical Problem

The present invention has been made to solve the foregoing problems of the prior art and therefore an aspect of the present invention is to provide a dichroic dye that has liquid crystal properties, dichroic properties and polymerizable reactivity, and that is used for forming a polarization film with excellent dichroic ratio, heat resistance, polarizing properties, and durability.

It is another aspect of the present invention to provide a composition containing a dichroic dye for a polarization film.

It is a further aspect of the invention to provide a method for forming a polarization plate having excellent dichroic ratio, polarizing properties, durability, and heat resistance using the composition containing the dichroic dye for the polarization film.

It is yet another aspect of the invention to provide a polarization plate with excellent dichroic ratio, polarizing properties, durability, and heat resistance which is manufactured by the method of the present invention.

Technical Solution

According to an aspect of the present invention, a dichroic dye has a structure of R1'-L1-(M,L,D). In the formula, D is a dichroic structure, M is a structure with liquid crystal properties, R1' is a reactive end functional group, and L1 and L are linking structures which couple R1', M, and D. The structure in the block includes one structure M with liquid crystal properties and one to three dichroic structures (D1, D2,and D3). If the structure includes two or more dichroic structures, the dichroic structures are coupled directly to each other or through a linking structure (L). M is coupled to the neighboring dichroic structures (D1, D2, and D3) by the linking structure (L). Here, the structure (M) with liquid crystal properties and the dichroic structures (D) are coupled regardless of order, and the dichroic structures (D1, D2, and D3) are different from each other.

According to another aspect of the invention, a composition for forming a polarization film comprises 1 to 98.85 parts by weight dichroic dye of the present invention and 0.15 to 5 parts by weight additives.

According to a further aspect of the invention, a method for forming a polarization plate includes endowing a substrate with orientation; coating the oriented substrate with a composition for forming a polarization film according to the present invention; and curing the composition.

Further, according to yet another aspect of the invention, a method for forming a polarization plate includes forming an alignment film on a substrate and endowing the alignment film with orientation; coating the alignment film with a composition for forming a polarization film according to the present invention; and curing the composition.

According to yet another aspect of the invention, a polarization plate includes a substrate having orientation; and a polarization film formed on the substrate.

According to yet another aspect of the invention, a polarization plate includes a substrate; an alignment film on the substrate; and a polarization film formed on the alignment film.

Advantageous Effects

According to certain or exemplary embodiments of the invention, a polarization plate includes a polarization film which is prepared by a simple process, in which a substrate is coated and cured using a dichroic dye. The polarization film according to the invention has excellent heat resistance, durability against high temperature and humidity, polarizing properties, and a great dichroic ratio.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a side section view of a polarization plate according to an exemplary embodiment of the present invention, including a substrate and a polarization film formed on the substrate; and FIG. 2 is a side section view of a polarization plate according to an exemplary embodiment of the present invention, including a substrate, an alignment film formed on the substrate, and a polarization film formed on the alignment film.

BEST MODE FOR CARRYING OUT THE INVENTION

The present invention provides a new material (hereinafter, referred to as a dichroic dye) that has a structure of R1'-L1-(M,L,D) with novel dichroic and liquid crystal properties, and that can be used for a composition to form a polarization film, with which a substrate of a polarization plate will be coated to improve dichroic ratio, polarizing properties, heat resistance, and durability.

The dichroic dye according to the present invention is a new material wherein a reactive end functional group R1', a chemical group M with liquid crystal properties, and a chemical group D with dichroic properties are coupled to each other by a linking group L.

In the dichroic dye, D represents a dichroic structure, M represents a structure with liquid crystal properties, and R1' represents a reactive end functional group. L1 and L are linking structures which couple R1', M and D.

The structure in the block may include one structure M with liquid crystal properties and one to three dichroic structures (D1, D2, and D3). If the dichroic dye has two or more dichroic structures (D1, D2, and D3), the dichroic structures are coupled directly to each other or through a linking structure (L). M is coupled with the neighboring dichroic structures (D1, D2, and D3) by the linking structure (L). Here, the structure (M) with liquid crystal properties and the dichroic structures (D1, D2, and D3) are coupled to each other regardless of order. Further, the dichroic structures contained in a dichroic dye of a single structure are different from each other. Also, the dichroic structures (D) may further have liquid crystal properties as well.

The dichroic dye forms a secure coating layer by the reactive end functional group (R1') during coating and drying thereby improving durability. In addition, the structure (M) with liquid crystal properties enhances orientation properties, which thereby improves the polarizing properties. The reactive end functional group (R1'), the structure (M) with liquid crystal properties, and the dichroic structures (D) are coupled to each other by the linking structure (L, L1, etc.), thereby increasing compatibility of the liquid crystal structure and the dichroic structure.

The dichroic dye may further include another end functional group (R2') and a linking structure (L3) which are linked to the other end of the structure of (M,L,D) to which a reactive end functional group (R1') and a linking structure (L1) are not coupled. A dichroic dye further comprising the reactive end functional group (R2') and the linking structure (L3) may have a structure of R1'-L1-(M,L,D)-L3-R2'. The end functional group (R2') additionally contained in the dichroic dye is reactive or unreactive.

In the dichroic dye, the structure (M) with liquid crystal properties is coupled to the dichroic chemical structure (D) by the linking structure (L) or the like in order to increase the orientation properties of the dichroic chemical structure (D) and thereby improve the polarizing degree.

The dichroic chemical structure (D) may be any of dyes which are generally used in this art and give dichroic properties. For example, the dichroic structure is selected, but is not limited to, from the group consisting of azo, anthraquinone, azomethine, indigo, thioindigo, cyanine, indane, azulene, phenylene, phthaloperin, and azine dyes.

The dichroic azo structure includes compounds with the following formulas, for example:

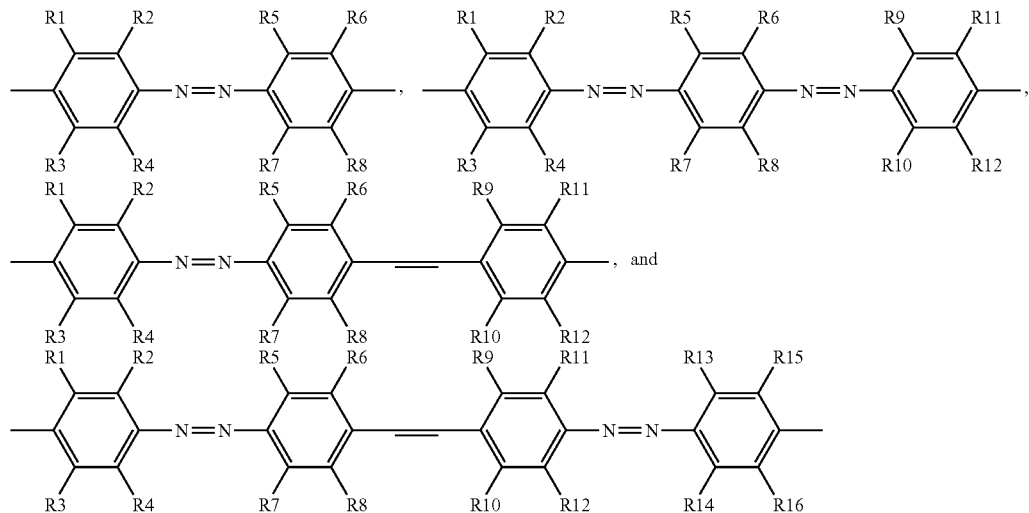

In the formulas, R1-R16 are substituents selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups; and R5 and R6 or R7 and R8 can be coupled to form phenyl groups.

The dichroic anthraquinone dyes have the following structure, for example:

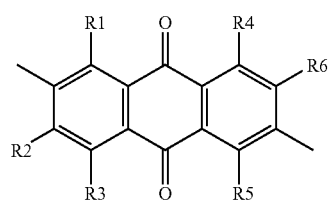

In the formula, R1-R6 are substituents selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups,

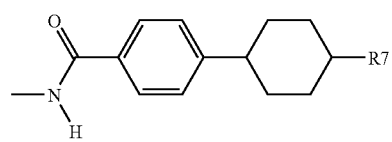

(where, R7 can be defined the same as R1-R6), and imide groups.

The dichroic azomethine dyes have the following structures, for example:

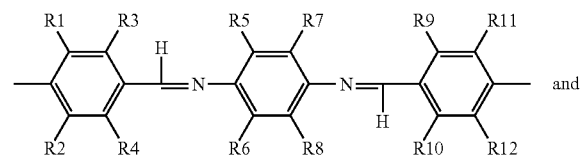

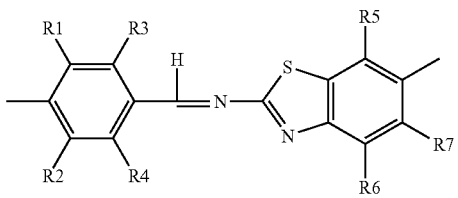

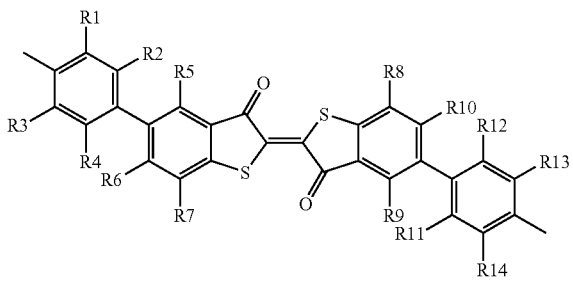

In the formulas, R1-R12 are substituents selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic indigo and thioindigo dyes have the following structures, for example:

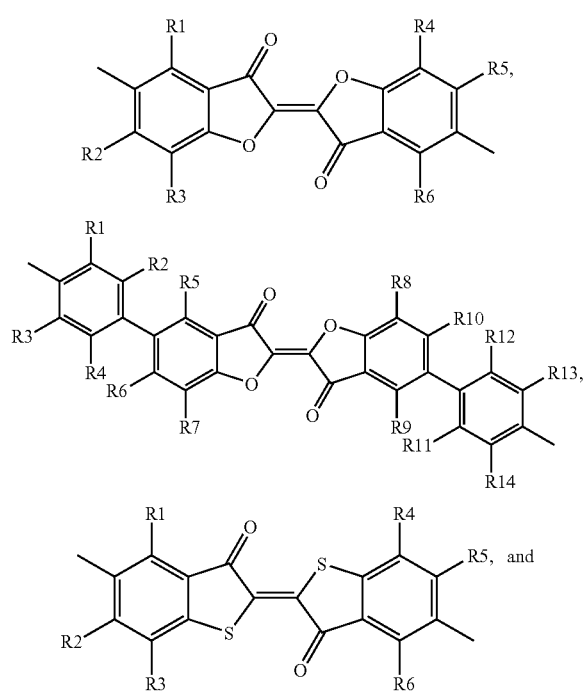

In the formulas, R1-R14 are substituents which are selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic cyanine dyes have the following structures, for example:

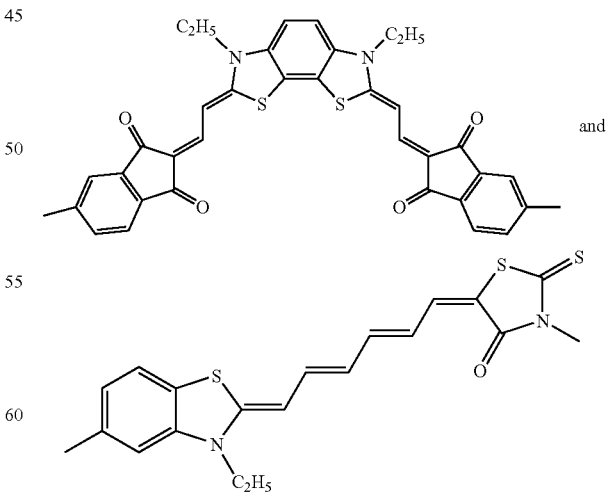

The dichroic indane dyes have the following structure, for example:

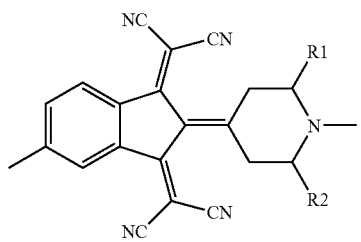

In the formula, R1-R2 are substituents selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic azulene dyes have the following structures, for example:

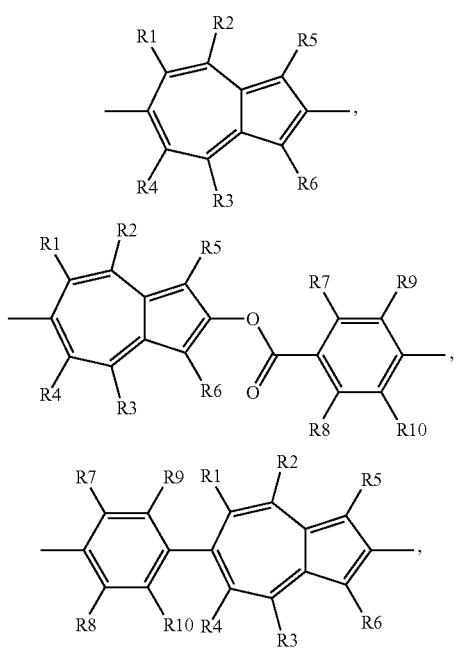

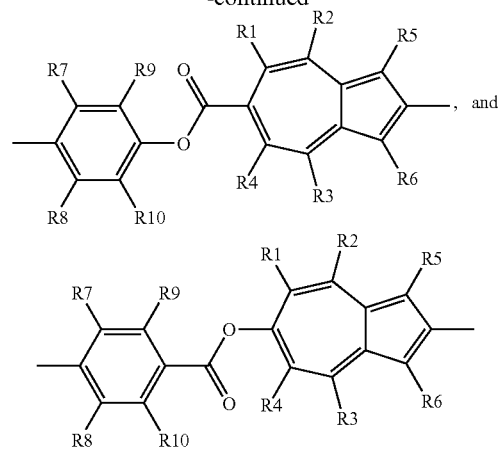

In the formulas, R1-R10 are substituents which are selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dirchroic phenylene dyes have the following structures, for example:

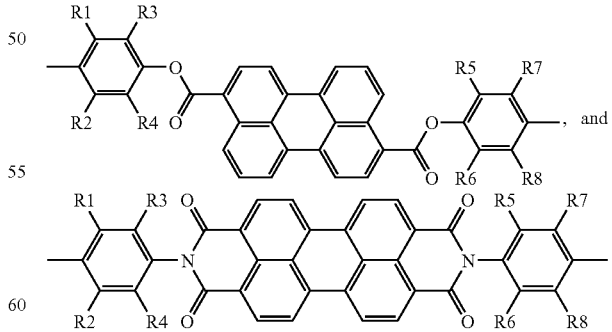

In the formulas, R1-R8 are substituents which is selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic phthaloperin dyes have the following structures, for example:

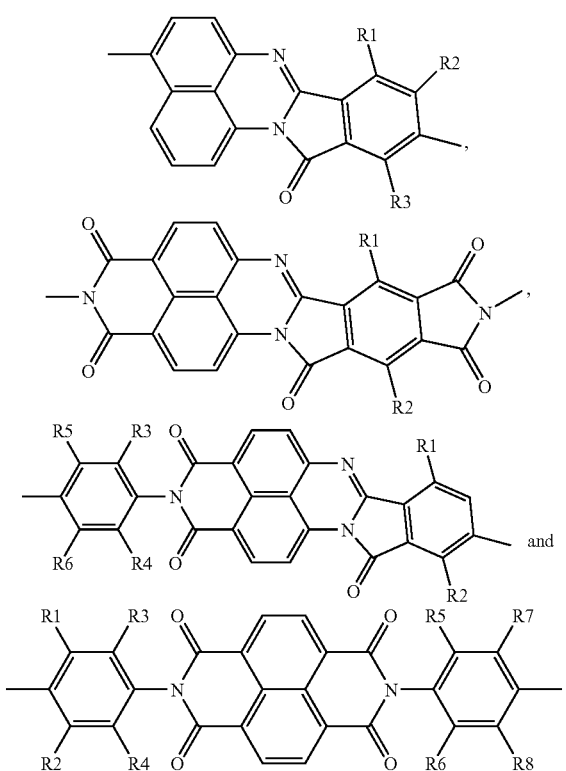

groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic azine dyes have the following structures, for example:

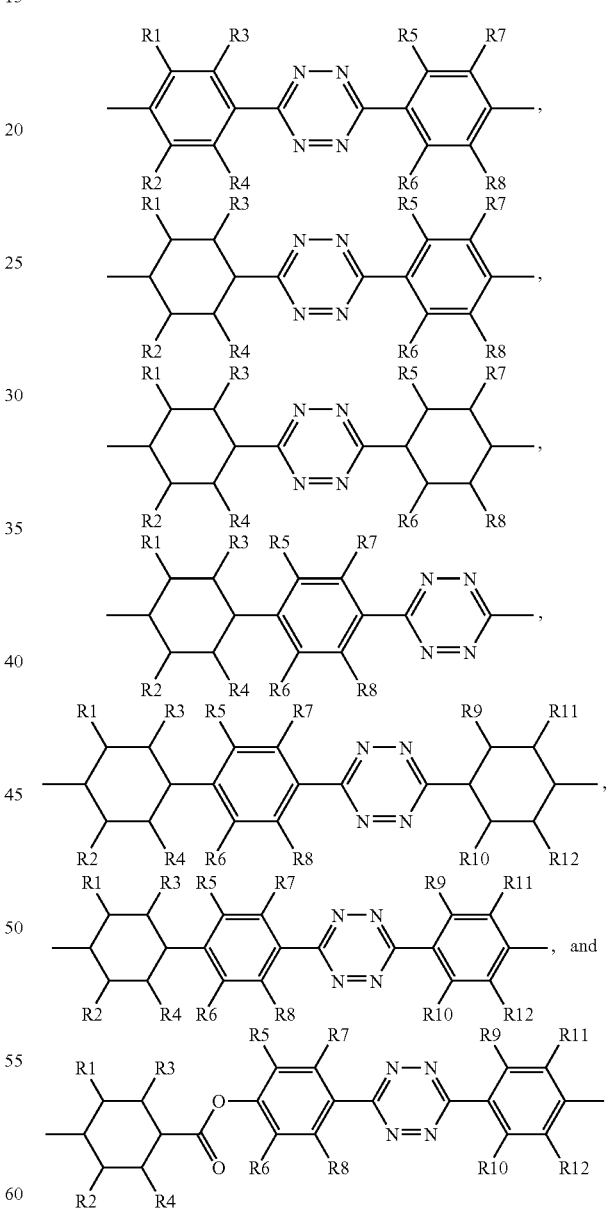

In the formulas, R1-R8 are substituents which is selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl In the formulas, R1-R12 are substituents which are selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The dichroic structures (D) may further have liquid crystal properties as well. In this case, the dichroic structures have the following formula, for example, but are not limited to:

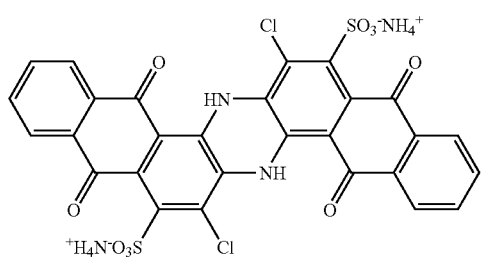

The structure (M) with liquid crystal properties may be any of chemical structures generally known to give liquid crystal properties in the art. The presence of the structure (M) with liquid crystal properties allows the dichroic structures (D) to increase theirs orientation properties, and thus improve their polarizing properties.

The structure (M) with liquid crystal properties includes compounds with the following formulas, for example, but is not limited to:

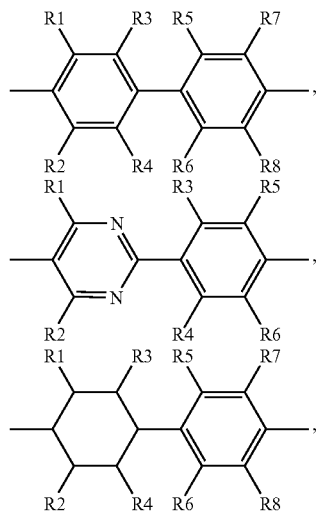

-continued

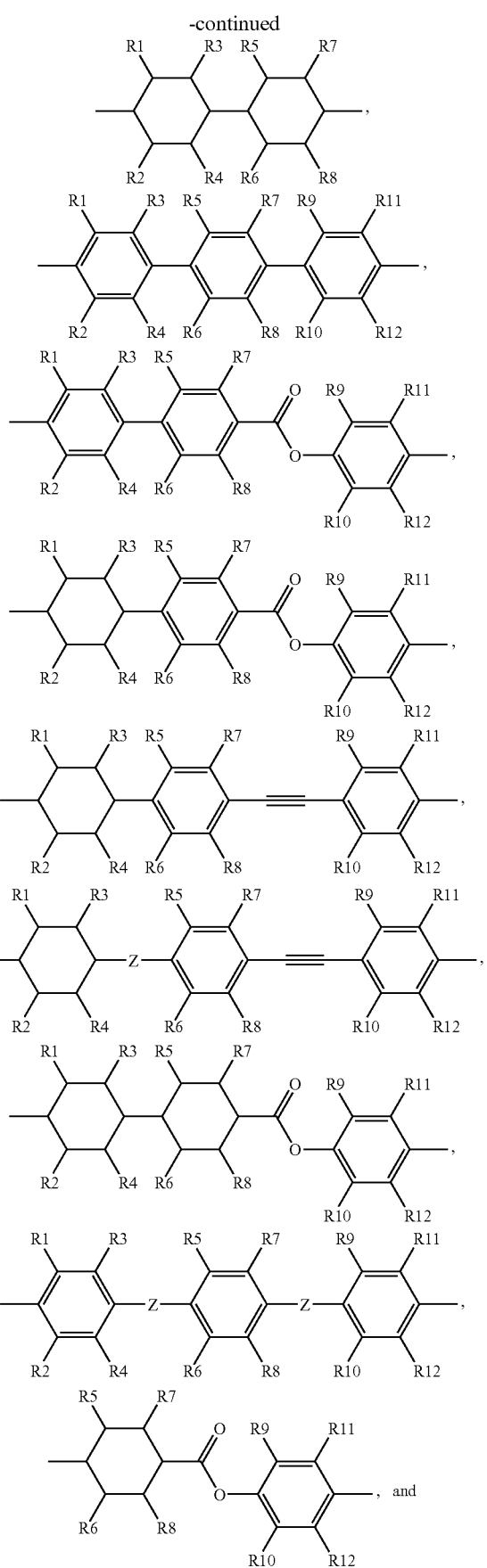

-continued

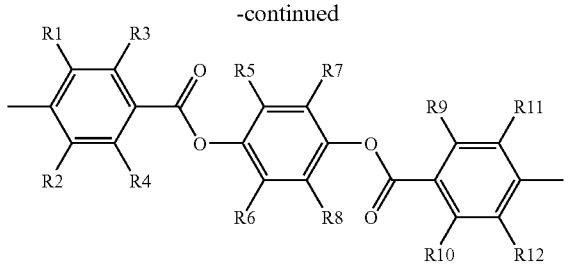

In the formulas, Z represents —COO—, —OCO—, —CH$_2$CH$_2$—, —CH=CH—, —C≡C— or a single bond and R1-R12 are substituents which are selected from the group consisting of hydrogen, C1-C20 straight or branched chain alkyl groups (for example, methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl), halogen groups (for example, fluorine, chlorine, bromine, and iodine), C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N—C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups.

The new dichroic dye of the present invention has a reactive end functional R1' at its end to facilitate the formation of a coating layer to improve durability. Moreover, the dichroic dye may further include a end functional group R2'. In this case, the end functional group R2' is provided as one the same as or different from the end functional group R1', and may be reactive or unreactive which is generally known in this art.

The reactive functional groups (R1' and R2') are one selected from the group consisting of the following structures, for example, but not limited to:

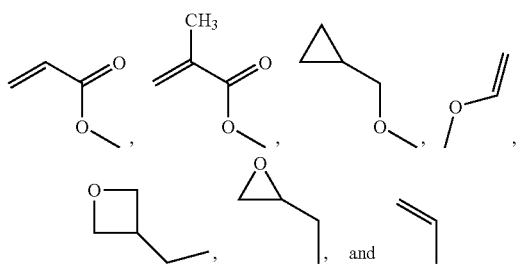

The unreactive end functional group (R2') is selected, but is not limited to, from the group consisting of C1-C20 alkyl groups, C1-C20 alkoxy groups, and cyclohexyl groups.

The dichroic structures (D), the structure (M) with liquid crystal properties, and the end functional groups (R1' and R2') are coupled to each other through the linking structures (L1, L, L3, etc.). L1, L, and L3 are linking structures which couple the dichroic structure (D) the structure (M) with liquid crystal properties and the end functional groups (R1', R2') and are the same or different from each other.

If one dichroic dye structure includes two or more dichroic structures (D1, D2, and D3), the dichroic structures are coupled directly to each other or one is coupled to a neighboring one or a structure having liquid crystal properties by a linking structure (L).

The linking structure is selected from the group consisting of

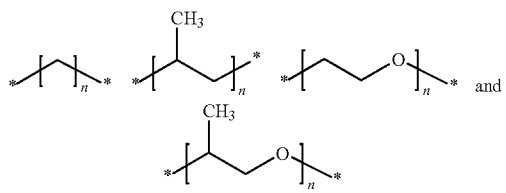

(wherein, n represents integer from 1 to 12). Further, linking structures employed in the same dichroic dye structure may be the same or different from each other.

In order to help understand new dichroic dyes according to the present invention, some structures are representatively illustrated as follows. It should be noted that the dichroic dyes according to the present invention are not limited to the following structures:

R1'-L1-M-L2-D1, R1'-L1-M-L2-D1-L3-R2', R1'-L1-M-L2-D1-D2-L3-R2', R1'-L1-M-L2-D1-L4-D2-L3-R2', R1'-L1-D1-L2-M-L4-D2-L5-D3, R1'-L1-D1-L2-M-L4-D2-L5-D3-L3-R2', R1'L1-D2-L2-D1-L4-M-L5-D3-L3-R2', R1'-L1-D3-L2-D1-L4-D2-L5-M-L3-R2', R1'-L1-D1-D2-L2-M-L4-D3-L3-R2', R1'-L1-D1-D2-D3-L2-M-L3-R2', R1'-L1-D1-D2-L2-M-L4-D3-L3-R2', R1'-L1-M-L2-D2-L3-R2', R1'-L1-D3-L2-M-L3-R2', R1'-L1-D3-D1-L2-M-L3-R2', and R1'-L1-D3-L2-M (in the formulas, M represents a structure with liquid crystal properties; D1, D2, and D3 represent dichroic structures, wherein dichroic structures employed in one dichroic dye structure are different from each other; L1, L2, L3, L4, and L5 represent linking structures, which may be the same or different from each other; and R1' and R2' represent end functional groups, which may be the same or different from each other).

The dichroic dye may be formed of a separate structure representing red, green, or blue, as necessary. Also, the dichroic dye may include a dichroic structure (D) that represents red, green and/or blue in a single structure. The color of the dichroic dye is determined due to the dichroic structure (D) in the dichroic dye.

Further, the dichroic dye may be formed with dichroic dyes having different colors besides red, green, and blue for color compensation. The dichroic dyes for the color compensation are also formed with a dichroic dye having separate structures or a single dichroic dye with a dichroic structure (D) which expresses a color besides red, green, and blue for color compensation. The color of the dichroic dye for the color compensation is determined due to the dichroic structure (D).

The dichroic dye of R1'-L1-(M,L,D) according to the present invention may be produced, but is not limited to, by the following process.

The dichroic structure (D) which forms the dichroic dye in the present invention is prepared with dichroic dyes having hydroxyl groups or amine groups (azo, anthraquinone, azomethine, indigo, thioindigo, cyanine, indane, azulene, phenylene, phthaloperin, and azine dyes) by a known method in the art, e.g., a method described in "Organic Chemistry in Colour" (published by Springer-Verlag, 1987) or "Dichroic Dyes for Liquid Crystal Displays" (published by CRC Press, 1994) and chemically coupled with another structure forming the dichroic dye.

For example, —OH group is introduced into the end of a structure (M) with liquid crystal properties of the dichroic dye and halogen groups are introduced into both ends of linking structure (L) thereby preparing halogen substituted alkanes (for example, dibromoalkane or dichloroalkane) or alkane dioic acids. The linking structure with halogen ends or alkane dioic acids is then coupled to the OH end of the structure with liquid crystal properties by ether or ester linkage. The structure with liquid crystal properties and the linking structure are linked to each other by alkylation or esterification.

Further, the dichroic dye having the hydroxyl or amine group and the structure with liquid crystal properties, which is coupled to the linking structure, are chemically coupled by ether or ester linking (amide linking for amine). In addition, the end functional groups are coupled to OH group, a halogen group, or an alkane dioic acid of the linking structure by ether or ester linkage (amide linkage for amine). The structure of (M,L,D) is chemically coupled to the end functional groups through the linking structure. The end functional groups and the linking structure are also coupled by the alkylation reaction or esterification generally known in the art. The end functional groups may be treated to have a suitable end for alkylation reaction, esterification, or the like before they are linked to the linking structure by a chemical reaction.

As such, the dichroic structure (D), the structure (M) with liquid crystal properties, the linking structure (L and L1), the end functional groups (R1' and R2'), etc. are coupled to one another by suitable reactions generally known in the art, thereby producing the dichroic dye of R1'-L1-(M,L,D) according to the present invention. Chemical reactions for linking the structures and functional groups for the components to carry out the reactions are generally known in the art, it will be apparent to those skilled in the art that modifications and variations can be made to produce the dichroic dye according to the present invention.

As a composition for polarization film, the dichroic dye is applied to a substrate to form a polarization film. The dichroic dyes of the invention are mixed into the composition for the polarization film, which forms the polarization film by coating or the like. Since the dichroic dyes of the invention have reactive photo- or heat-groups, a curing reaction is carried out quickly after applying the dichroic dyes to the substrate. Thus, processing time is reduced, thereby lowering manufacturing costs. Moreover, the polarization film is formed to have excellent thermostability and durability.

The composition for the polarization film comprises 1 to 98.85 parts by weight dichroic dyes of the present invention and 0.15 to 5 parts by weight additional additives. If the dichroic dyes are less than 1 part by weight, a polarization plate prepared with the dichroic dyes has inferior polarizing performance. If the dichroic dyes are more than 98.85 parts by weight, a polarizing plate prepared with the dichroic dyes has deteriorated curing degree, thereby reducing durability.

If necessary, the composition for the polarization film may be formed with a mixture of a dichroic dye representing red, a dichroic dye representing blue and a dichroic dye representing green, or a dichroic dye having a red dichroic structure, a blue dichroic structure and a green dichroic structure. A polarization plate formed of the mixture of the dichroic dyes can linearly polarize light in the entire range of visible rays. In order for color compensation, the composition for the polarization film may be mixed with dichroic dyes of different colors besides red, green and blue, or with dichroic dyes having dichroic structures of different colors besides red, green, and blue. Here, red, green, and blue dichroic dyes and dichroic dyes for the color compensation are mixed at any ratio according to absorption values of the material at certain wavelengths. The mixture ratio is not specifically limited.

The additional additives include, but are not limited to, catalysts, sensitizers, stabilizers, chain transfer agents, inhibitors, accelerators, surfactants, lubricants, moisturizing agents, dispersing agents, hydrophobizing agents, bonding agents, flow enhancers, foam inhibitors, diluents, coloring agents, dyes, pigment, etc. As necessary, the additional additives may be properly selected and mixed. If the content of additives is less than 0.15 parts by weight, the additives do not promote coating performance properly. If the content of additives is more than 5 parts by weight, a coating layer is insufficiently adhered to the substrate.

The composition for the polarization film may also include a curable liquid crystal compound up to 95 parts by weight, if desired. The curable liquid crystal compound improves the orientation properties of the dichroic dye and includes, for example, 4-(3-acryloyloxy-propoxy)benzoic acid o-tolyl ester, etc. If the composition contains a curing liquid crystal compound of more than 95 parts by weight, the polarization plate of the composition has inferior polarizing performance.

The composition for the polarization film may also comprise 1 to 10, and preferably 2 to 7 parts by weight of a curing agent. When the composition is applied to the substrate and cured using an electron beam, the composition does not need to be mixed with an additional curing agent. However, when the composition for forming a color filter layer is subject to a light or heat curing process, and dried after the coating process, an additional curing agent should be mixed with the composition.

The curing agent may be any one generally used in the art. For example, the curing agent provided as a light polymerization initiator based on ultraviolet rays is, but not limited to, one or more selected from the group consisting of at least one active halogen compound selected from halomethyl oxadiazole compounds and halomethyl-s-triazine compounds, 3-aryl-substituted coumarin compounds, benzophenol compounds, acetophenone compounds and derivatives thereof, cyclopentadiene-benzene-Fe complex salts thereof, and oxime compounds.

The halomethyl oxadiazole compounds provided as active halogen compounds include, for example, 2-halomethyl-5-vinyl-1,3,4-oxadiazole, 2-trichloromethyl-5-styryl-1,3,4-oxadiazole, 2-trichloromethyl-5-(p-cyanostyryl)-1,3,4-oxadiazole, and 2-trichloromethyl-5-(p-methoxystyryl)-1,3,4-oxadiazole compounds.

The halomethyl-s-triazine compounds provided as active halogen compounds include, for example, vinyl-halomethyl-s-triazine compounds, 2-(naphtho-1-yl)-4,6-bis-halomethyl-s-triazine compounds, and 4-(p-aminophenyl)-2,6-di-halomethyl-s-triazine compounds.

In detail, the halomethyl-s-triazine compounds include, for example, 2,4-bis(trichloromethyl)-6-p-methoxystyryl-s-triazine, 2,6-bis(trichloromethyl)-4-(3,4-methylenedioxyphenyl)-1,3,5-triazine, 2,6-bis(trichloromethyl)-4-(4-methoxyphenyl)-1,3,5-triazine, 2,4-bis(trichloromethyl)-6-(1-p-dimethylaminophenyl-1,3-butadienyl)-s-triazine, 2-trichloromethyl-4-amino-6-p-methoxystyryl-s-triazine, 2-(naphtho-1-yl)-4,6-bis-trichloromethyl-s-triazine, 2-(4-methoxy-naphtho-1-yl)-4,6-bis-trichloromethyl-s-triazine, 2-(4-ethoxy-naphtho-1-yl)-4,6-bis-trichloromethyl-s-triazine, 2-(4-butoxy-naphtho-1-yl)-4,6-bis-trichloromethyl-s- triazine, 2-[4-(2-methoxyethyl)-naphtho-1-yl]-4,6-bis-trichloromethyl-s-triazine, 2-[4-(2-ethoxyethyl)-naphtho-1-yl]-4,6-bis-trichloromethyl-s-triazine, 2-[4-(2-butoxyethyl)-naphtho-1-yl]-4,6-bis-trichloromethyl-s-triazine, 2-(2-methoxy-naphtho-1-yl)-4,6-bis-trichloromethyl-s-triazine, 2-(6-methoxy-5-methyl-naphtho-2-yl)-4,6-bis-trichloromethyl-s-triazine, 2-(6-methoxy-naphtho-2-yl)-4,6-bis-trichloromethyl-s-triazine, 2-(5-methoxy-naphtho-2-yl)-4,6-bis-trichloromethyl-s-triazine, 2-(4,7-dimethoxy-naphtho-1-yl)-4,6-bis-trichloromethyl-s-triazine, 2-(6-ethoxy-naphtho-2-yl)-4,6-bis-trichloromethyl-s-triazine, 2-(4,5-dimethoxy-naphtho-1-yl)-4,6-bis-trichloromethyl-s-triazine, 4-p-N,N-di(ethoxycarbonylmethyl)aminophenyl-2,6-di(trichloromethyl)-s-triazine, 4-[o-methyl-p-N,N-di(ethoxycarbonylmethyl)aminophenyl]-2,6-di(trichloromethyl)-s-triazine, 4-[p-N,N-di(chloroethyl)aminophenyl]-2,6-di(trichloromethyl)-s-triazine, 4-[o-methyl-p-N,N-di(chloroethyl)aminophenyl]-2,6-di(trichloromethyl)-s-triazine, 4-(p-N-chloroethylaminophenyl)-2,6-di(trichloromethyl)-s-triazine, 4-(p-N-ethoxycarbonylmethylaminophenyl)-2,6-di(trichloromethyl)-s-triazine, 4-[p-N,N-di(phenyl)aminophenyl]-2,6-di(trichloromethyl)-s-triazine, 4-(p-N-chloroethylcarbonylaminophenyl)-2,6-di(trichloromethyl)-s-triazine, 4-[p-N-(p-methoxyphenyl)carbonylaminophenyl-2,6-di(trichloromethyl)-s-triazine, 4-[m-N,N-di(ethoxycarbonylmethyl)aminophenyl-2,6-di(trichloromethyl)-s-triazine, 4-[m-bromo-p-N,N-di(ethoxycarbonylmethyl)aminophenyl]-2,6-di(trichloromethyl)-s-triazine, 4-[m-chloro-p-N,N-di(ethoxycarbonylmethyl)aminophenyl]-2,6-di(trichloromethyl)-s-triazine, 4-[m-fluoro-p-N,N-di(ethoxycarbonylmethyl)aminophenyl]-2,6-di(trichloromethyl)-s-triazine, 4-[o-bromo-p-N,N-di(ethoxycarbonylmethyl)aminophenyl]-2,6-di(trichloromethyl)-s-triazine, 4-[o-chloro-p-N,N-di(ethoxycarbonylmethyl)aminophenyl]-2,6-di(trichloromethyl)-s-triazine, 4-[o-fluoro-p-N,N-di(ethoxycarbonylmethyl)aminophenyl]-2,6-di(trichloromethyl)-s-triazine, 4-[o-bromo-p-N,N-di(chloroethyl)aminophenyl]-2,6-di(trichloromethyl)-s-triazine, 4-[o-chloro-p-N,N-di(chloroethyl)aminophenyl]-2,6-di(trichloromethyl)-s-triazine, 4-[o-fluoro-p-N,N-di(chloroethyl)aminophenyl]-2,6-di(trichloromethyl)-s-triazine, 4-[m-bromo-p-N,N-di(chloroethyl)aminophenyl]-2,6-di(trichloromethyl)-s-triazine, 4-[m-chloro-p-N,N-di(chloroethyl)aminophenyl]-2,6-di(trichloromethyl)-s-triazine, 4-[m-fluoro-g-N,N-di(chloroethyl)aminophenyl]-2,6-di(trichloromethyl)-s-triazine, 4-(m-bromo-p-N-ethoxycarbonylmethylaminophenyl)-2,6-di(trichloromethyl)-s-triazine, 4-(m-chloro-p-N-ethoxycarbonylmethylaminophenyl)-2,6-di(trichloromethyl)-s-triazine, 4-(m-fluoro-p-N-ethoxycarbonylmethylaminophenyl)-2,6-di(trichloromethyl)-s-triazine, 4-(o-bromo-p-N-ethoxycarbonylmethylaminophenyl)-2,6-di(trichloromethyl)-s-triazine, 4-(o-chloro-p-N-ethoxycarbonylmethylaminophenyl)-2,6-di(trichloromethyl)-s-triazine, 4-(o-fluoro-p-N-ethoxycarbonylmethylaminophenyl)-2,6-di(trichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N-chloroethylaminophenyl)-2,6-di(trichloromethyl)-s-triazine, 4-(o-bromo-p-N-chloroethylaminophenyl)-2,6-di(trichloromethyl)-s-triazine, 4-(o-chloro-p-N-chloroethylaminophenyl)-2,6-di(trichloromethyl)-s-triazine, and 4-(o-fluoro-p-N-chloroethylaminophenyl)-2,6-di(trichloromethyl)-s-triazine.

Further, the curing agent for a light polymerization initiator includes IRGACURE series (e.g., IRGACURE 651, IRGACURE 184, IRGACURE 500, IRGACURE 11000, IRGACURE 149, IRGACURE 819, and IRGACURE 261) available from Ciba Specialty Chemicals, DAROCUR series (e.g., DAROCUR 1173), 4,4'-bis(diethylamino)-benzophenone, 2-(O-benzoyloxime)-1-[4-(phenylthio)phenyl]-1,2-octanedione, 1-(O-acetyl oxime)-1-[9-ethyl-6-(2-methylbenzoyl)-9H-carbazol-3-yl]-ethanone, 2-benzyl-2-dimethylamino-4-morpholinobutyro phenone, 2,2-dimethoxy-2-phenylacetophenone, 2-(o-chlorophenyl)-4,5-diphenylimidazolyl dimmer, 2-(o-fluorophenyl)-4,5-diphenylimidazolyl dimmer, 2-(o-methoxyphenyl)-4,5-diphenylimidazolyl dimmer, 2-(p-methoxyphenyl)-4,5-diphenylimidazolyl dimmer, 2-(p-dimethoxyphenyl)-4,5-diphenylimidazolyl dimmer, 2-(2,4-dimethoxyphenyl)-4,5-diphenylimidazolyl dimmer, 2-(p-methylmercaptophenyl)-4,5-diphenylimidazolyl dimmer, benzoin isopropyl ether, etc. The curing agent can be used as a single substance or a mixture of the foregoing substances.

If the composition contains a curing agent less than 1 part by weight, a curing degree is low. If containing a curing agent more than 10 parts by weight, the hardness of a cured film is reduced.

Components constituting the composition for polarization film are mixed in an appropriate solvent, and the resulting mixture is coated onto a substrate and cured to form a the polarization film. The solvent used in the composition according to the present invention, and the solid content in the composition may be easily and optionally used as generally known in the art to achieve the purpose of the invention, but the present invention is not particularly limited thereto.

The substrate may be a glass substrate or a plastic substrate. The plastic substrate includes, but is not limited to, acrylic resin, polycarbonate resin, epoxy resin, polyester resin, or the like.

The composition for the polarization film is coated on the substrate by thin-film coating methods generally used in the art, such as a spin-coating, blade-coating, cast-coating, roll coating, etc. The composition is coated so that the finally cured polarization film has a thickness of 0.1 to 10 microns, and preferably 0.3 to 7 microns. If the thickness of the polarization film is less than 0.1 microns, the polarization film does not linearly polarize visible rays enough. If the thickness is more than 10 microns, the orientation properties of the composition are deteriorated, thereby reducing the linearly polarizing properties of the polarization film.

After completion of coating the composition on the substrate, the composition is cured to form the polarization film. A curing method includes, but is not limited to, electron beam curing, thermal curing, and ultraviolet curing. As shown in FIG. 1, the composition for the polarization film is cured by the foregoing methods, thereby forming a polarization plate with the polarization film formed on the substrate. As described above, a curing agent is not necessary when performing electron beam curing. In thermal or ultraviolet curing, however, the composition is combined with a curing agent.

As described above, the polarization film is formed by curing the composition for the polarization film. Curing may be carried out by any of methods known in the art. The polarization plate having the polarization film according to the present invention is excellent in dichroic ratio, heat resistance, durability, and polarizing properties.

Meanwhile, when the polarization plate produced with the dichroic dyes is used for a liquid crystal display, the orientation properties of the coated dichroic dyes should be considered. In order to promote the orientation properties of the dichroic dyes, the substrate is endowed with orientation properties or a separated alignment film is prepared on the substrate to give orientation properties, and then the polarization film is formed with the composition for the polarization film. After forming an alignment film on the substrate, the composition is coated thereon and cured, thereby forming a polarization plate wherein the substrate 1, the alignment film 2, and a polarization film 3 are sequentially layered, as shown in FIG. 2.

The orientation properties on the substrate are obtained by forming prominences and depressions on the surface of the substrate by rubbing to endow molecules with orientations. Also, an additional alignment film is formed on the substrate and is endowed with orientation properties by rubbing or photo alignment.

The additional alignment film is formed with, but is not limited to, at least one selected from the group consisting of azo compounds, polyimide, polyamide, cinnamic acid esters, and amic acids. A single substance or a mixture of the foregoing materials is used as the alignment film.

To form a rubbing alignment film of polyimide, a polymer solution of amic acids is applied to the surface of glass and imidized at 200° C. That is, a polymer of amic acids is generally imidized by high-temperature treatment to form an alignment film.

In the present invention, however, a polymer of amic acids may be used as the alignment film, without amic acids being imidized. As mentioned above, after forming the additional alignment film, the orientation properties are endowed to the alignment film by rubbing or photo alignment. Namely, the prominences and depressions formed by rubbing on the alignment film and therefore the molecules are endowed with orientations, thereby forming the alignment film. The alignment film helps the liquid crystal molecules on the polarization film to further have orientations.

Meanwhile, as a noncontact surface treatment, the photo alignment may be also adopted to give anisotropy to the film by irradiating polarized ultraviolet rays to the polarization film.

The rubbing process may cause generation of static electricity, scratches on the surface of the film, impurities due to dust or the like, etc. Thus, the photo alignment is preferable in view of productivity.

The surface of the polarization plate formed of the composition including the dichroic dyes according to the present invention may be further treated by at least one selected from the group consisting of antistatic treatment, corona treatment, hard coating process, anti-reflection treatment, and antiglare treatment.

With the aforementioned processes of the present invention, it is possible to obtain the polarization plate that includes the substrate 1 endowed with the orientation properties and the polarization film 3 formed on the substrate 1, as shown in FIG. 1, or the polarization plate that includes the substrate 1, the alignment film 2 formed on the substrate 1 and endowed with the orientation properties, and the polarization film 3 on the alignment film 2, as shown in FIG. 2. The polarization plate of the present invention has a cross-linkage structure, excellent polarizing properties and durability at high temperature and high pressure conditions, and thus does not undergo discoloration and polarizing deterioration. The polarizing plate is used for automobile dashboards, planes, liquid crystal projectors, etc. which require excellent heat resistance, durability, and polarizing properties.

Mode for the Invention

Hereinafter, the present invention will be described in detail with reference to examples. It should be noted that the following examples are given by way of illustration and do not limit the present invention.

SYNTHETIC EXAMPLE 1

(1) Synthesis of 4-(6-bromo hexyloxy)phenyl 4-{[6-(acryloyloxy)hexyl]oxy}benzoate (Formula (5) in Scheme)

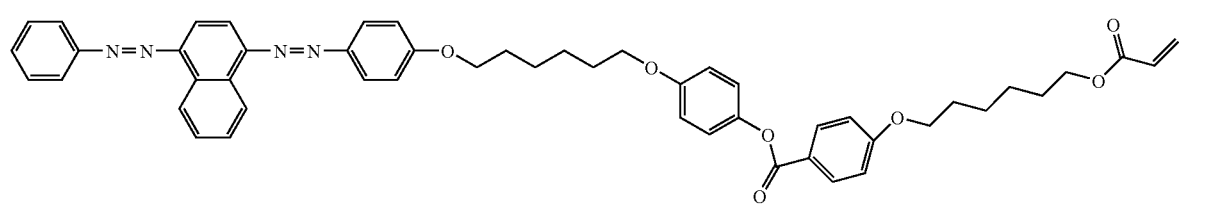

(I)

As expressed in the following reaction scheme, hydroquinone (1) (4.5 g) and 1,6-dibromo hexane (2) (10 g) were dissolved in methanol (100 ml) at room temperature. Adding potassium hydroxide (2.3 g) to the mixture solution, the resulting solution was refluxed at 60° C. overnight. Then, after lowering the solution to room temperature and evaporating methanol, the product was extracted three times with water (100 ml) and ethyl acetate (100 ml). After removing water with magnesium sulfate and evaporating the solvent, the product was refined by column chromatography (eluent: ethyl acetate/hexane=1/5) thereby obtaining 4.4 g of 4-(6-bromohexyloxy)phenol (3).

4-{6-(acryloyloxy)hexyl]oxy}benzoic acid (4) (2.8 g) was dissolved in tetrahydrofuran (THF) (100 ml) at room temperature and the resulting solution was adjusted to 0° C. Then, thionyl chloride (12 ml, 1M in THF) was added to the solution and the resulting solution was stirred for 30 minutes. 4-(6-bromohexyloxy)phenol (2.5 g) and triethylamine (13 ml) were added to the solution, and the resulting mixture is stirred at 0° C. for one hour and then stirred at room temperature overnight. Then, a saturated aqueous ammonium chloride solution was poured into the reaction mixture, thereby completing the reaction. The product was extracted three times with ethyl acetate (50 ml). After removing water with magnesium sulfate and evaporating the solvent, the product was refined by column chromatography (eluent: ethyl acetate/hexane=1/2) thereby obtaining 4-(6-bromo hexyloxy)phenyl 4-{[6-(acryloyloxy)hexyl]oxy}benzoate (5) (3 g).

(2) Synthesis of {{[(4-phenyl-diazine)-1-naphthyl-diazine]-phenyloxy}6-hexyloxy}4-phenyl 4-{[6-(acryloyloxy)hexyl]oxy}benzoate (Formula (I))

The obtained 4-(6-bromo hexyloxy)phenyl 4-{[6-(acryloyloxy)hexyl]oxy}benzoate (5) (200 mg), Disperse Orange 13 (6) (128 mg) $K_2CO_3$ (150 mg), and butylated hydroxytoluene (BHT) (5 mg) were dissolved in acetone (20 ml) at room temperature. The reaction mixture was stirred at 70° C. overnight. Then, a saturated aqueous ammonium chloride solution was poured into the reaction mixture, thereby completing the reaction. The product was extracted three times with ethyl acetate (50 ml). After removing water with magnesium sulfate and evaporating the solvent, the product was refined by column chromatography (eluent: ethyl acetate/hexane=1/3), thereby obtaining {{[(4-phenyl-diazine)-1-naphthyl-diazine]-phenyloxy}6-hexyloxy}4-phenyl 4-{[6-(acryloyloxy)hexyl]oxy}benzoate (I) (300 mg).

Reaction Scheme:

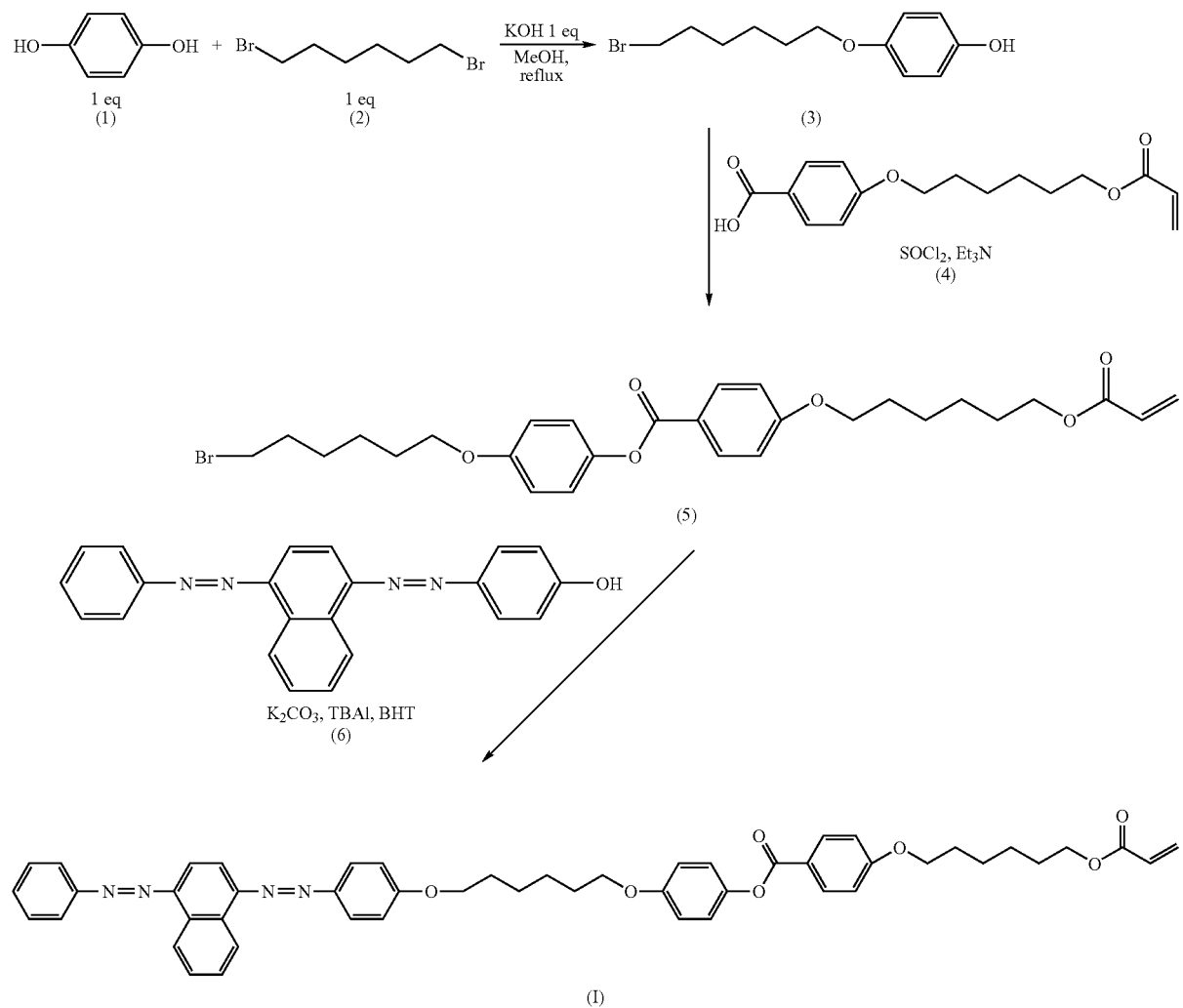

SYNTHETIC EXAMPLE 2

Synthesis of {{[(4-normalhexyl-phenyl-diazine)-1-naphthyl-diazine]-phenyloxy}6-hexyloxy}4-phenyl, 4-{[6-(acryloyloxy)hexyl]oxy}benzoate (Formula (II))

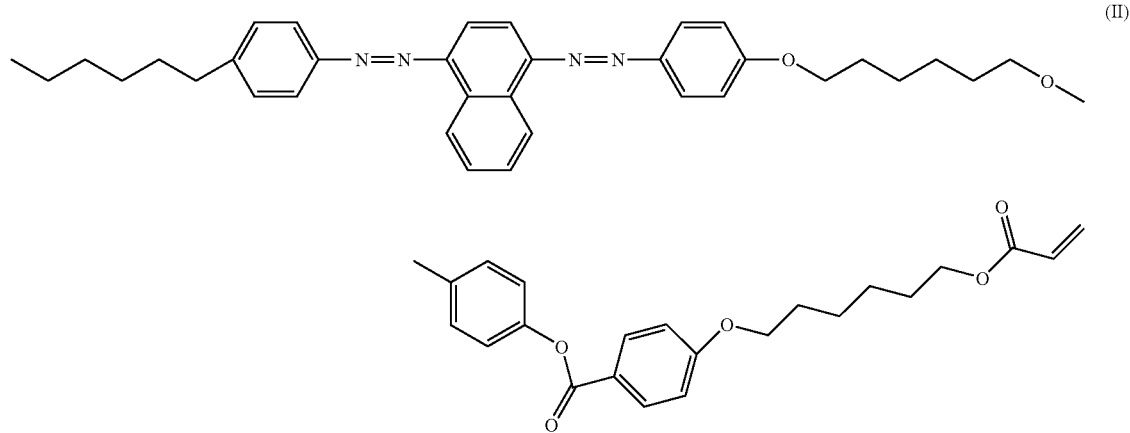

(II)

4-(6-bromo hexyloxy)phenyl 4-{([6-(acryloyloxy)hexyl]oxy}benzoate (formula (5) produced in process (1) of synthetic example 1) (200 mg), {{[(4-normalhexyl-phenyl) diazenyl]-1-naphthyl}diazenyl}-4-phenol (135 mg), $K_2CO_3$ (150 mg), and BHT (5 mg) were dissolved in acetone (20 ml) at room temperature. The reaction mixture was stirred at 70° C. overnight. Then, a saturated aqueous ammonium chloride solution was poured into the reaction mixture, thereby completing the reaction. The product is extracted three times with ethyl acetate (50 ml). After removing water with magnesium sulfate and evaporating the solvent, the product is refined by column chromatography (eluent: ethyl acetate/hexane=1/5), thereby obtaining {{[(4-normalhexyl-phenyl-diazine)-1-naphthyl-diazine]-phenyloxy}6-hexyloxy}4-phenyl, 4-{([6-(acryloyloxy)hexyl]oxy}benzoate (formula (II)) (300 mg).

SYNTHETIC EXAMPLE 3

(1) Synthesis of 4-(6-acryloyloxy-hexyloxy)-benzoic acid 4-(5-bromo-phenyloxy)-phenyl ester Following the same process (1) as that of synthetic example 1 except for using 1,5-dibromo pentane instead of 1,6-dibromo hexane in the reaction with hydroquinone of the first step, 4-(6-acryloyloxy-hexyloxy)-benzoic acid 4-(5-bromo-phenyloxy)-phenyl ester was prepared.

(2) Synthesis of {{[(4-phenyl-diazine)-1-naphthyl-diazine]-phenyloxy}6-pentyloxy}4-phenyl 4-{[6-(acryloyloxy)hexyl]oxy}benzoate (formula (III))

Disperse Orange 13 (147 mg) and $K_2CO_3$ (155.43 mg) were dissolved in acetonitrile (30 ml) at room temperature and the resulting solution was stirred for about 15 minutes. 4-(6-acryloyloxy-hexyloxy)-benzoic acid 4-(5-bromo-phenyloxy)-phenyl ester (obtained at process (1) of synthetic example 3) (200 mg) and BHT (33.04 mg) were added to the solution and the resulting solution was boiled for 18 hours. The organic solution was washed twice with $NH_4Cl$ and once with NaCl and then separated by column (10:1, hexane:EtOAc), thereby giving a compound with formula (III) (221 mg, yield: 73%).

EXAMPLE 1

Fabrication of Polarization Plate

A sample of a polarization plate was formed with a composition including each of the synthesized dichroic dyes I to III for a polarization film.

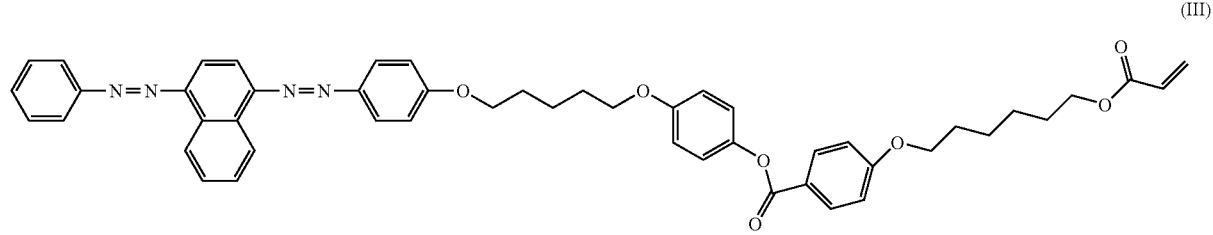

(III)

A 2 weight percent (wt %) solution for forming an alignment film (formed by dissolving 2 wt % polyacrylate which had a photosensitive functional branch of methoxycinnamate (MPN-Ci) in 98 wt % cyclopentanone (CPO)) were spin-coated on respective three glass substrate plates, spin-coated at 1500 rpm for 30 seconds and then dried at 80° C. for one and half minutes thereby a coating layer having a thickness of 0.1 μm is formed. Then, the coating layer was exposed to an ultraviolet lamp with an intensity of 100 mW/cm$^2$, which was linearly polarized, at a speed of 3 m/min at room temperature, thereby alignment film is formed.

The substrate plates having the alignment film formed thereon were coated respectively with compositions 1 to 3 for a polarization film including the dichroic dyes I to III from the synthetic examples 1 to 3, respectively, to form polarization films.

Each of the compositions 1 to 3 for the polarization films was prepared with a 21 wt % solution in which the dichroic dyes from synthetic examples 1 to 3 and a liquid crystal compound RMM17 ™ (commercially available from Merck and Co., Ltd.) were mixed at a weight ratio of 5:95 and dissolved in chloroform at room temperature.

Since RMM17™ used as the liquid crystal compound contains a 5 wt % curing agent, an additional curing agent was not added to the compositions.

The compositions 1 to 3 for the polarization films were respectively spin-coated on the alignment film which is optically oriented at 1000 rpm for 30 seconds. Then, the spin-coated compositions for the polarization films were dried at 50° C. for one minute. For optical cross-linkage of the liquid crystals and the dye materials, the coating layer was exposed to an ultraviolet lamp with 100 mW/cm$^2$ at 3 m/min. The cured polarization film had a thickness of 0.9 μm.

Samples 1 to 3 of polarization plates having a dichroic liquid crystal layer optically aligned on the glass plate were manufacture by the foregoing processes and their polarizing degrees and transmittances were measured at wavelengths of the respective dyes. At the peak wavelength ($\lambda_{max}$=450 nm), Sample 1 had a polarizing degree of 88.0% and a transmittance of 31.7%, Sample 2 had a polarizing degree of 76.5% and a transmittance of 39.5% at the peak wavelength ($\lambda_{max}$=450 nm), and Sample 3 had a polarizing degree of 87.9% and a transmittance of 47.7% at the peak wavelength ($\lambda_{max}$=442 nm).

COMPARATIVE EXAMPLE 1

Comparative Example 1 was prepared to compare a dichroic dye chemically coupled to the linking structure according to the present invention with dyes without having a linking structure in view of performance.

The following dichroic dye with formula (IV) was prepared as follows.

4-{[6-(acryloyloxy)hexyl]oxy}benzoic acid (276 mg) was dissolved in THF (20 ml) at room temperature. The solution was adjusted to 0° C. and thionyl chloride (1.2 ml, 1M in THY) is added thereto. The reactants were stirred at the same temperature for 30 minutes. Disperse Orange 13 (350 mg), triethyl amine (1.6 ml) and dimethylaminopyridine (DMAP) (10 mg) were added to the solution. The resulting mixture was stirred for one hour at 0° C. and then stirred at room temperature overnight. Then, a saturated aqueous ammonium chloride solution was poured into the reaction mixture, thereby completing the reaction. The product was extracted three times with ethylacetate (50 ml). After removing water with magnesium sulfate and evaporating the solvent, the product was refined by column chromatography (eluent: ethyl acetate/hexane=1/5), thereby giving [(4-phenyl-diazine)-1-naphthyl-diazine]-phenyl 4-{([6-(acryloyloxy)hexyl]oxy}benzoate (650 mg).

In Comparative Example 1, except for using the dichroic dye (RSY013) with formula (IV) as a dye with dichroic and liquid crystal properties instead of the dichroic dye with formula (I), Sample 4 of a polarization plate was produced in the same manner as Example 1. Then, its polarizing degree and transmittance were measured. At the peak wavelength ($\lambda_{max}$=450 nm), Sample 4 had a polarizing degree of 54.4% and a transmittance of 52.2%. As Sample 4 of the polarization plate had lowered compatibility of the dichroic dye and the liquid crystal materials, it had a significantly lower polarizing degree. Thus, it was proved that, when a liquid crystal structure was chemically coupled to a dichroic structure by a linking structure in the dyes with liquid crystal properties according to the invention, it has increased compatibility to the dichroic dye and the liquid crystal materials, which improves the polarizing degree.

COMPARATIVE EXAMPLE 2

Comparative Example 2 was prepared to highlight the performance of the dichroic dye where the liquid crystal structure is chemically coupled to the dye structure according to the present invention. In Comparative Example 2, except for using the following dichroic dye (GHL2-127) of formula (V) without having a liquid crystal structure as a dye instead of the dichroic dye with formula (II), Sample 5 of a polarization plate was produced in the same manner as Example 1. Then, its polarizing degree and transmittance were measured.

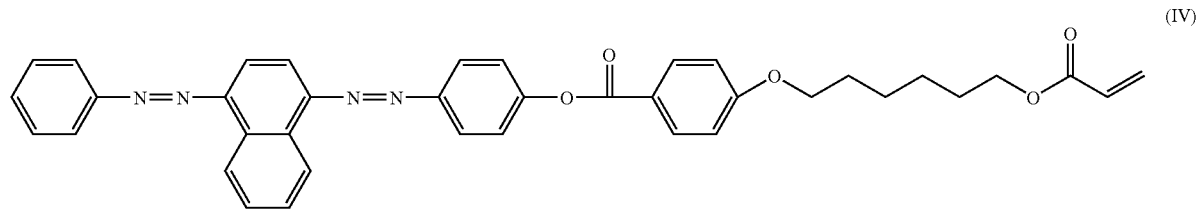

(IV)

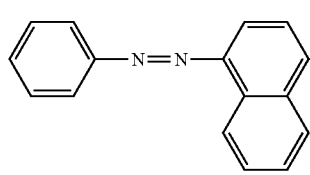

(V)

At the peak wavelength ($\lambda_{max}$=444 nm), Sample 5 had a polarizing degree of 85.4% and a transmittance of 44.4%. As the polarization plate sample 5 had lower compatibility to the dichroic dye and the liquid crystal materials, it has a lower polarizing degree as compared with that of Sample 2.

COMPARATIVE EXAMPLE 3

Comparative example 3 was performed to determine the performance of the dichroic dye where the reactive structure was chemically coupled to the dye structure according to the present invention. In Comparative Example 3, sample 6 of a polarization plate was prepared in the same manner as Example 1, except that a reactive functional group-free Disperse Orange 13 of following formula (VI) was used instead of the dichroic dye of formula (III) as the dichroic dye.

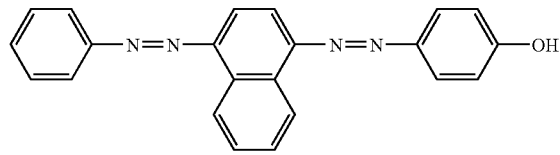

(VI)

At the peak wavelength ($\lambda_{max}$=450 nm), Sample 6 had a polarizing degree of 75.0% and a transmittance of 13.0%. The polarization plate sample 6 was considerably reduced in polarizing degree and transmittance, and had a poor surface curing degree and inferior durability as compared with the sample 3.

Although the various examples of the present invention have been shown and described in connection with azo dyes, it is apparent to those skilled in the art that anthraquinone, azomethine, indigo, thioindigo, cyanine, indane, azulene, phenylene, phthaloperin or azine-based dyes, dichroic dyes having liquid crystal structures, linking structures and reactive end functional groups, and compositions comprising the dichroic dyes for a polarization film can be prepared by the aforementioned examples.

The invention claimed is:
1. A dichroic dye comprising a structure of (reactive end functional group)-L1-(M,L,D),
wherein D is at least one of dichroic structure selected from the group consisting of azo, anthraquinone, azomethine, indigo, thioindigo, cyanine, indane, azulene, perylene, phthaloperin, and azine dyes;
wherein the azo dye is at least one selected from the group consisting of

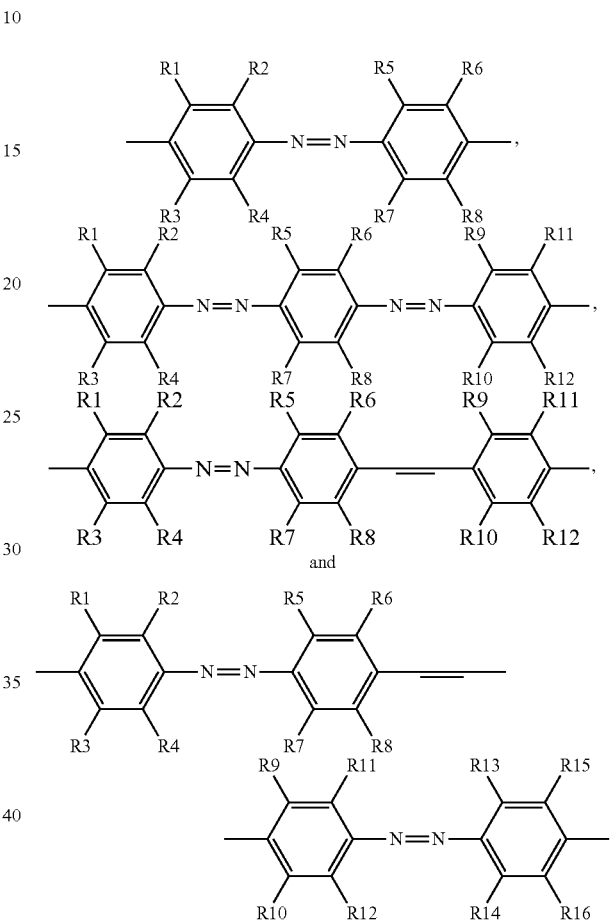

(wherein R1-R16 are substituents which are selected from the group consisting of hydrogen, C1-C20 straight or branched chain alkyl groups such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl, halogen groups such as fluorine, chlorine, bromine, and iodine, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N-C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups; and coupled with R5 and R6 or R7 and R8 can be coupled to form phenyl groups);

wherein the anthraquinone dye is at least one selected from the group consisting of

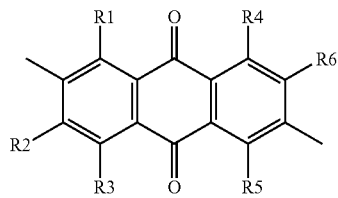

(wherein R1-R6 are substituents which are selected from the group consisting of hydrogen, C1-C20 straight or branched chain alkyl groups such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl, halogen groups such as fluorine, chlorine, bromine, and iodine, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N-C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups,

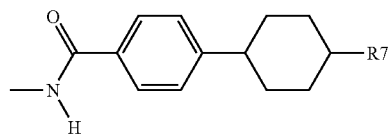

(wherein, R7 is defined the same as in R1-R6), and imide groups);

wherein the azomethine dye is at least one selected from the group consisting of

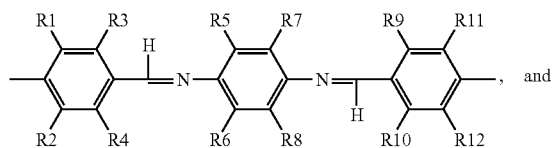

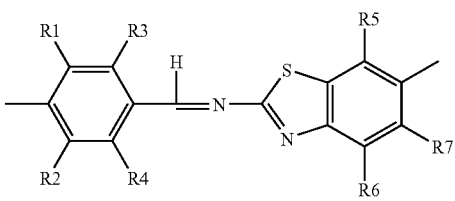

(wherein R1-R12 are substituents selected from the group consisting of hydrogen, C1-C20 straight or branched chain alkyl groups such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl, halogen groups such as fluorine, chlorine, bromine, and iodine, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N-C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups);

wherein the indigo or the thioindigo dye is at least one selected from the group consisting of

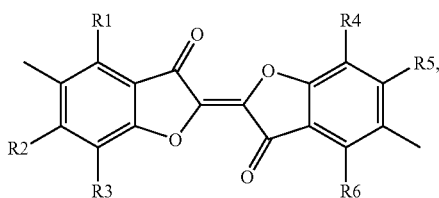

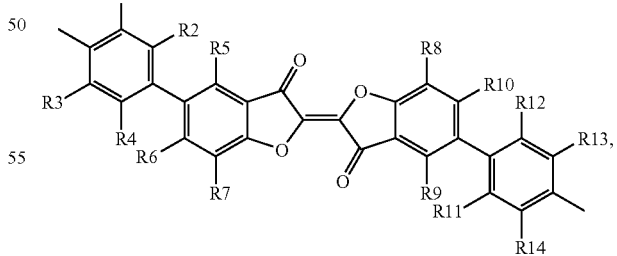

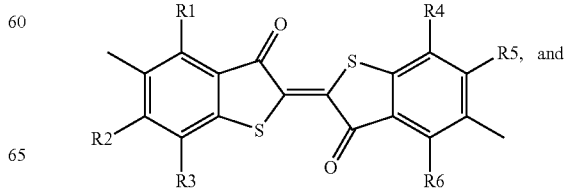

33

-continued

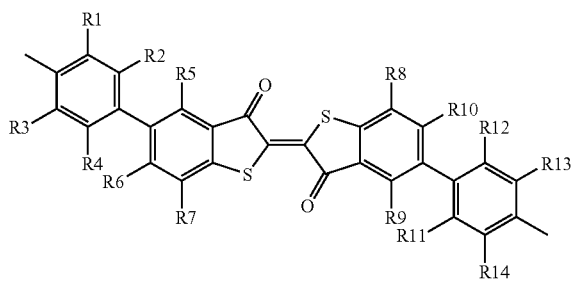

(wherein R1-R14 are substituents which are selected from the group consisting of hydrogen, C1-C20 straight or branched chain alkyl groups such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl, halogen groups such as fluorine, chlorine, bromine, and iodine, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N-C1-C20 alkylacylamino groups, carbamoylamino groups, sulfamoylamino groups, C1-C20 aliphatic oxy carbonylamino groups, C6-C20 aryloxycarbonylamino groups, C1-C20aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups);

wherein the cyanine dye is at least one selected from the group consisting of

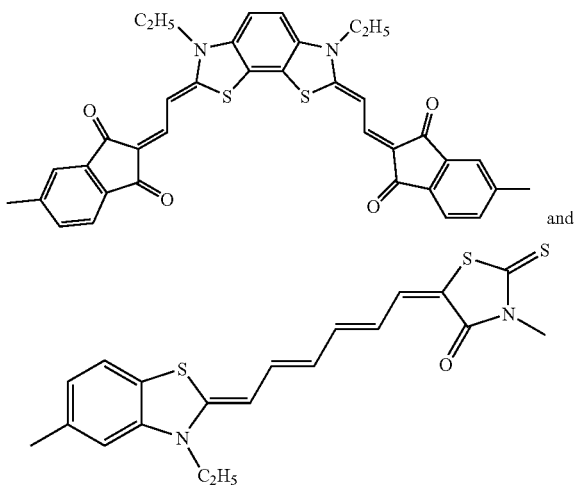

and wherein the indane dye is at least one selected from the group consisting of

34

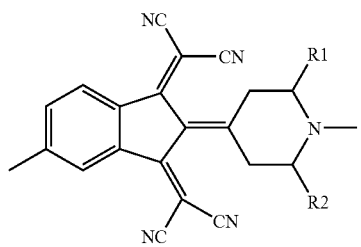

(wherein, R1-R2 are substituents selected from the group consisting of hydrogen, C1-C20 straight or branched chain alkyl groups such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl, halogen groups such as fluorine, chlorine, bromine, and iodine, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N-C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups);

wherein the azulene dye is at least one selected from the group consisting of

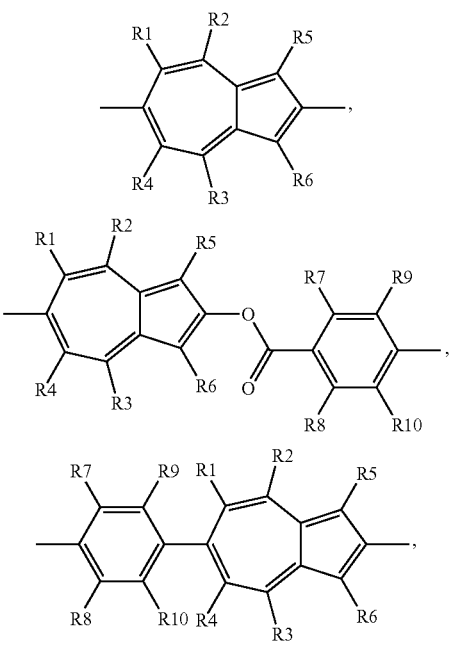

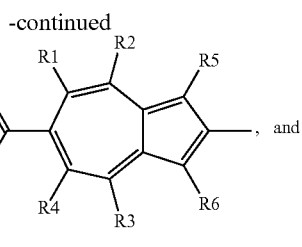

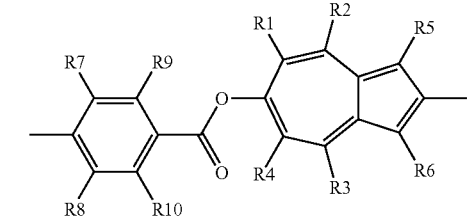

(wherein R1-R10 are substituents selected from the group consisting of hydrogen, C1-C20 straight or branched chain alkyl groups such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl, halogen groups such as fluorine, chlorine, bromine, and iodine, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N-C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups);

wherein the perylene dye is at least one selected from the group consisting of

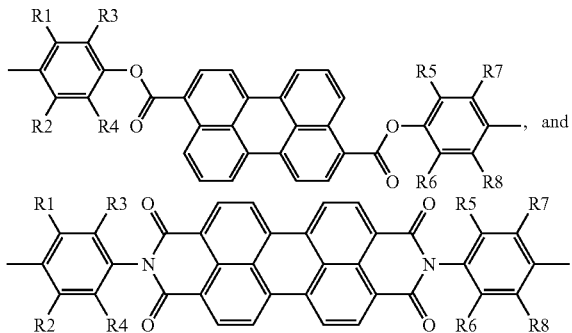

(wherein R1-R8 are substituents selected from the group consisting of hydrogen, C1-C20 straight or branched chain alkyl groups such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl, halogen groups such as fluorine, chlorine, bromine, and iodine, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N-C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups);

wherein the phthaloperin dye is at least one selected from the group consisting of

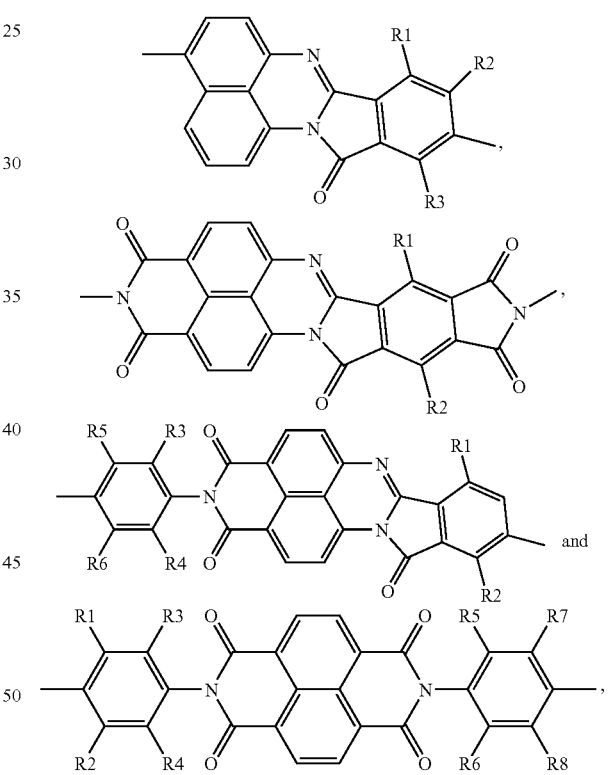

(wherein, R1-R8 are substituents selected from the group consisting of hydrogen, C1-C20 straight or branched chain alkyl groups such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamantyl, halogen groups such as fluorine, chlorine, bromine, and iodine, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N-C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups);

wherein the azine dye is at least one selected from the group consisting of

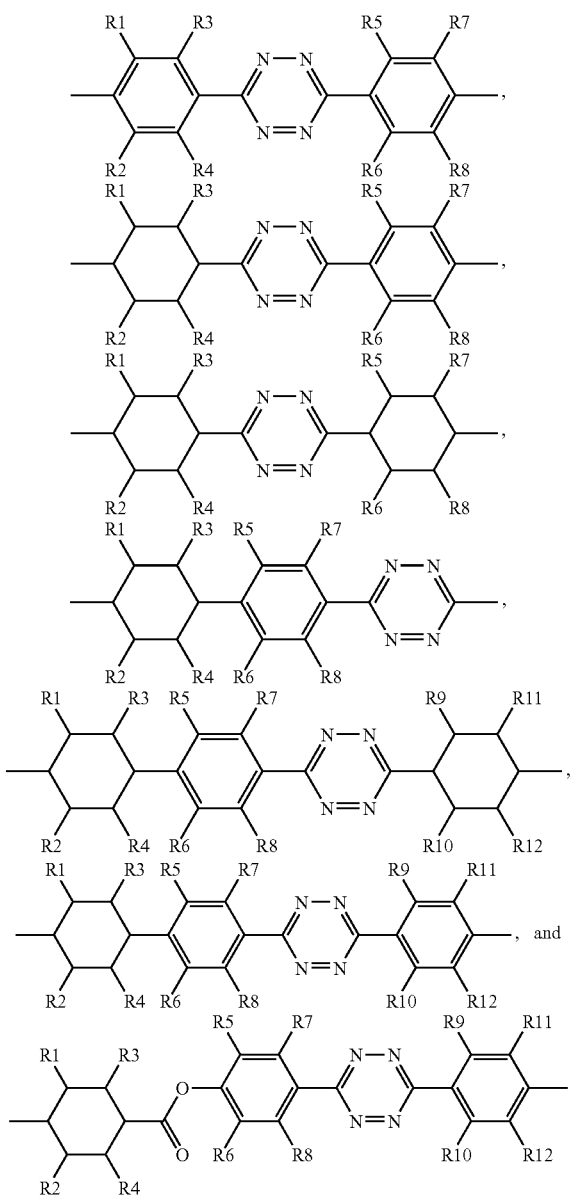

(wherein, R1-R12 are substituents selected from the group consisting of hydrogen, C1-C20 straight or branched chain alkyl groups such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-nor-bornyl, and 1-adamantyl, halogen groups such as fluorine, chlorine, bromine, and iodine, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N-C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups);

wherein M is at least one of a structure with liquid crystal properties selected from the group consisting of

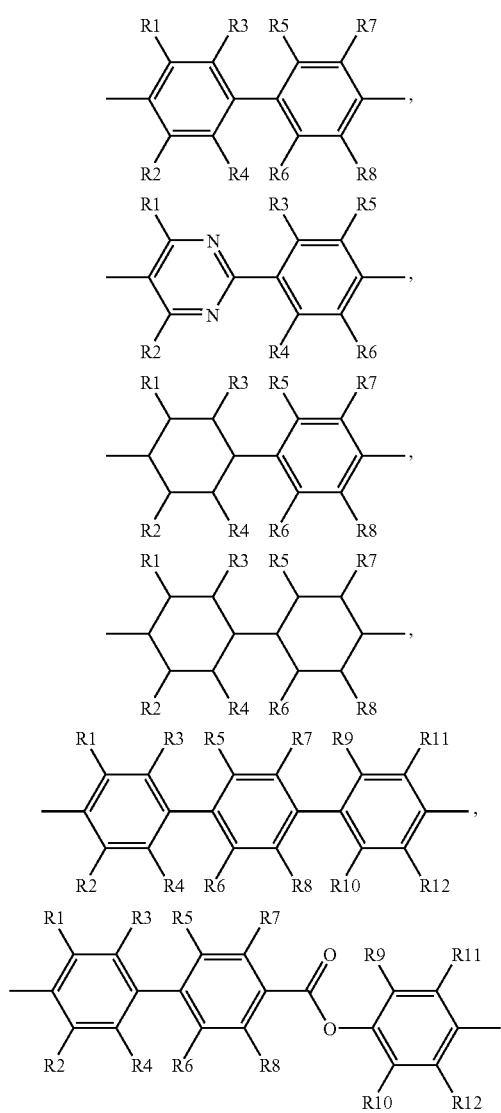

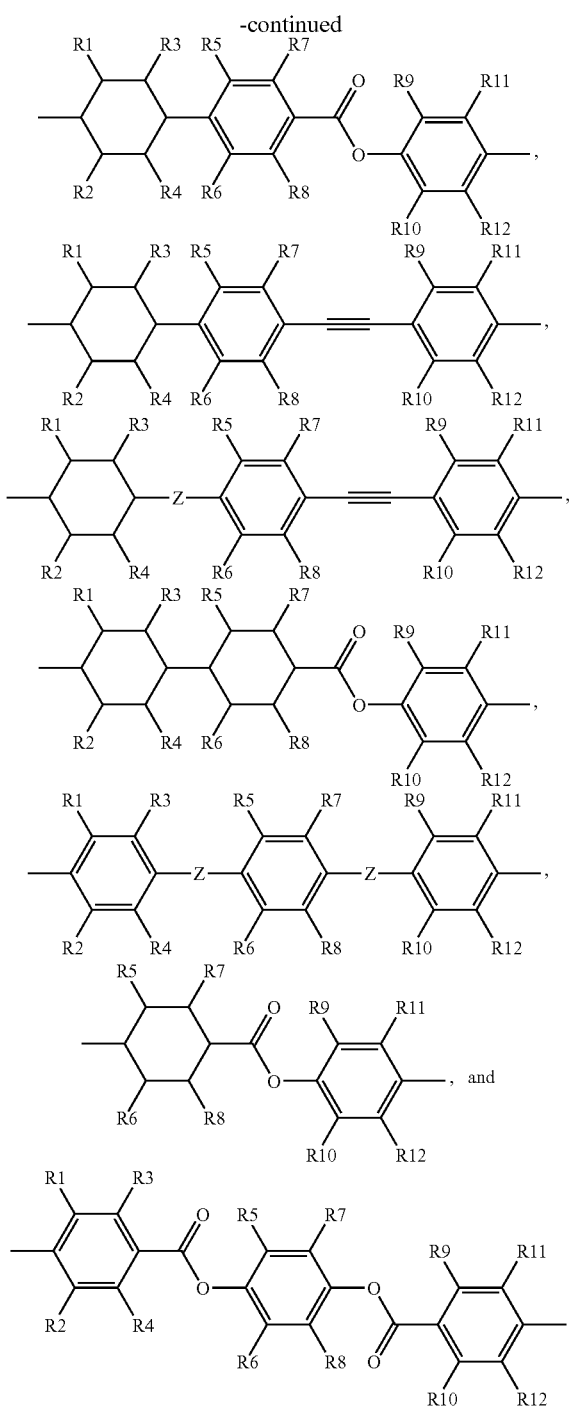

(where Z represents —COO—, —OCO—, —CH$_2$CH$_2$—, —CH═CH—, —C≡C— or a single bond and R1-R12 are substituents selected from the group consisting of hydrogen, C1-C20 straight or branched chain alkyl groups such as methyl, ethyl, propyl, isopropyl, butyl, t-butyl, pentyl, hexyl, heptyl, heptyl, octyl, 2-ethylhexyl, dodecyl, hexadecyl, cyclopropyl, cyclopentyl, cyclohexyl, 1-norbornyl, and 1-adamantyl, halogen groups such as fluorine, chlorine, bromine, and iodine, C1-C20 alkoxy groups, C1-C20 aliphatic groups, C1-C20 aliphatic amino groups, C1-C20 aliphatic imino groups, C1-C20 aliphatic alkyl imino groups, C6-C20 aryl groups, C5-C20 hetero ring groups, cyano groups, C1-C20 carboxyl groups, carbamoyl groups, C1-C20 aliphatic oxy carbonyl groups, C6-C20 aryl oxy carbonyl groups, C1-C20 acyl groups, hydroxyl groups, C1-C20 aliphatic oxy groups, C6-C20 aryloxy groups, C1-C20 acyloxy groups, carbamoyloxy groups, C5-C20 hetero ring oxy groups, C1-C20 aliphatic oxy carbonyloxy groups, N-C1-C20 alkylacylamino groups, carbamoylamino groups, sulfamoylamino groups, C1-C20 aliphatic oxy carbonylamino groups, C6-C20 aryloxycarbonylamino groups, C1-C20 aliphatic sulfonylamino groups, C5-C20 arylsulfonylamino groups, C1-C20 aliphatic thio groups, C6-C20 arylthio groups, C1-C20 aliphatic sulfonyl groups, C6-C20 arylsulfonyl groups, sulfamoyl groups, sulfo groups, and imide groups);

wherein L and L1 are linking structures which are the same or different from each other and are selected from the group consisting of

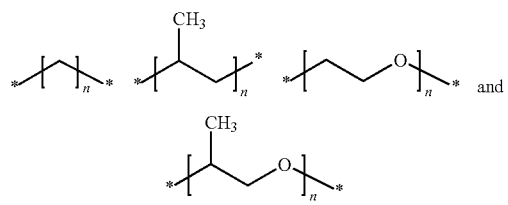

(wherein, n represents integer from 1 to 12);

wherein the reactive end functional group is selected from the group consisting of

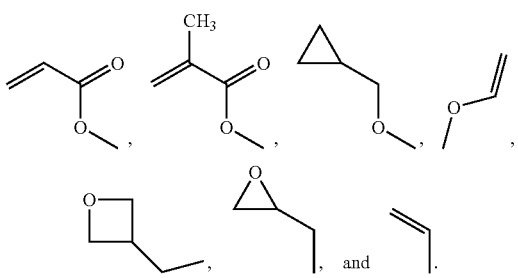

wherein the structure of (M,L,D) includes one structure M with liquid crystal properties and one to three dichroic structures (D1, D2, and D3); if the structure of (M,L,D) includes two or more dichroic structures, the dichroic structures are coupled directly to each other or through a linking structure (L); the structure M is coupled to the dichroic structures (D1, D2, or D3) by the linking structure (L), and the dichroic structures (D1, D2, and D3) are different from each other.

2. The dichroic dyes according to claim 1, wherein the dichroic structure (D) comprises further liquid crystal properties.

3. The dichroic dye according to claim 1, wherein the dichroic dye has a structure of (reactive end functional group)-L1-(M,L,D)-L3-(reactive or unreactive end functional group), wherein L3 is a linking structure which is the same or different from L and L1, and which is selected from the group consisting of

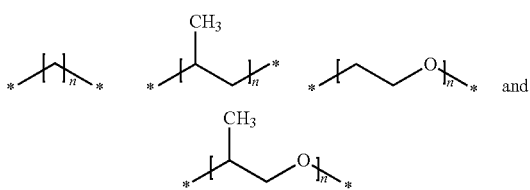

(wherein, n represents integer from 1 to 12); and
wherein the reactive or unreactive end functional group is a group, when reactive, selected from the group consisting of

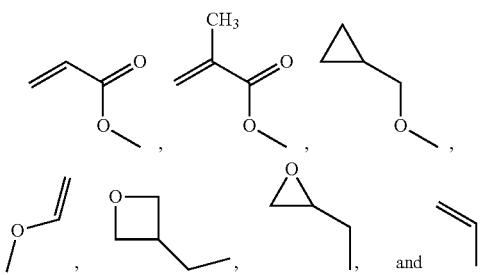

or, a group, when unreactive, selected from the group consisting of C1-C20 alkyl groups, C1-C20 alkoxy groups, and cyclohexyl groups.

4. A composition for forming a polarization film, comprising 1 to 98.85 parts by weight of the dichroic dye according to claims 1, and 0.15 to 5 parts by weight of additives.

5. The composition according to claim 4, wherein the dichroic dye comprises a mixture of red, green, and blue dichroic dyes or the dichroic dye has dichroic structures representing red, green, and blue in a single structure.

6. The composition according to claim 5, wherein the mixture of the red, green, and blue dichroic dyes linearly polarizes light in the range of visible rays.

7. The composition according to claim 4, comprising a dichroic dye for color compensation or a dichroic dye having a dichroic structure for color compensation.

8. The composition according to claim 4, further comprising a curable liquid crystal compound up to 95 parts by weight.

9. The composition according to claim 4, further comprising 1 to 10 parts by weight curing agent.

10. A method for forming a polarization plate, comprising:
endowing a substrate with orientation;
coating the substrate having the orientation with the composition for forming the polarization film according to claim 4; and
curing the composition.

11. The method according to claim 10, wherein the composition for forming the polarization film is coated such that a finally cured polarization film has a thickness of 0.1 to 10 microns.

12. The method according to claim 10, wherein after the curing step, a formed polarization film is further processed by at least one selected from the group consisting of antistatic treatment, corona treatment, hard coating process, anti-reflection treatment, and antiglare treatment.

13. A method for forming a polarization plate comprising:
forming an alignment film on a substrate and endowing the alignment film with orientation; coating the alignment film with the composition for forming the polarization film according to claim 4; and
curing the composition.

14. The method according to claim 13, wherein the composition for forming the polarization film is coated such that a finally cured polarization film has a thickness of 0.1 to 10 microns.

15. The method according to claim 13, wherein after the curing step, a formed polarization film is further processed by at least one selected from the group consisting of antistatic treatment, corona treatment, hard coating process, anti-reflection treatment, and antiglare treatment.

16. A polarization plate prepared according to claim 10 comprising: a substrate having orientation; and a polarization film formed on the substrate.

17. A polarization plate prepared according to claim 13 comprising:
a substrate; an alignment film on the substrate; and a polarization film formed on the alignment film.

* * * * *